US007983353B2

(12) United States Patent
Grant et al.

(10) Patent No.: US 7,983,353 B2
(45) Date of Patent: Jul. 19, 2011

(54) CODE POWER ESTIMATION FOR MIMO SIGNALS

(75) Inventors: Stephen J. Grant, Cary, NC (US); Douglas A. Cairns, Durham, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 667 days.

(21) Appl. No.: 12/036,368

(22) Filed: Feb. 25, 2008

(65) Prior Publication Data

US 2009/0213909 A1 Aug. 27, 2009

(51) Int. Cl.
*H04B 7/02* (2006.01)
*H04L 1/02* (2006.01)

(52) U.S. Cl. .............................. 375/267; 375/346
(58) Field of Classification Search .......... 375/260, 375/267, 316, 346
See application file for complete search history.

(56) References Cited

U.S. PATENT DOCUMENTS

| 6,005,887 | A | 12/1999 | Bottomley et al. |
|---|---|---|---|
| 2001/0028677 | A1 | 10/2001 | Wang et al. |
| 2003/0031234 | A1 | 2/2003 | Smee et al. |
| 2005/0111528 | A1 | 5/2005 | Fulghum et al. |
| 2005/0195889 | A1 | 9/2005 | Grant et al. |
| 2005/0201447 | A1 | 9/2005 | Cairns et al. |
| 2006/0256843 | A1* | 11/2006 | Grant et al. ............... 375/148 |

FOREIGN PATENT DOCUMENTS

| WO | 2005/096517 A1 | 10/2005 |
| WO | 2006037593 A1 | 4/2006 |
| WO | 2006/132593 A2 | 12/2006 |
| WO | 2008/076053 A2 | 6/2008 |

OTHER PUBLICATIONS

Jonsson, E. et al. "Receiver Parametric Covariance Estimation for Transmit Diversity." Co-pending U.S. Appl. No. 11/751,109, filed May 21, 2007.
Bottomley, G. E. et al. "A Generalized RAKE Receiver for Interference Suppression." IEEE Journal on Selected Areas in Communications, vol. 18, No. 8, Aug. 2000, pp. 1536-1545.
Fulghum, T. L. et al. "Method and Apparatus for Determining Combining Weights for MIMO Receivers." Co-pending U.S. Appl. No. 11/613,677, filed Dec. 20, 2006.

(Continued)

*Primary Examiner* — Chieh M. Fan
*Assistant Examiner* — Freshteh N Aghdam
(74) *Attorney, Agent, or Firm* — Coate & Bennett, P.L.L.C.

(57) ABSTRACT

Methods and apparatus for estimating code-reuse interference associated with a received multi-stream multiple-input multiple-output (MIMO) signal are disclosed. An estimate for the data-to-pilot power ratio, $\Gamma_{D/P}$, may be obtained as a by-product of parametric estimation of impairment covariance associated with the received MIMO signal. In an exemplary method, a parametric impairment model is constructed for a received MIMO signal, the parametric model omitting code-reuse interference. Impairment covariance is measured, using, in one or more embodiments, received pilot symbol data. The parametric impairment model is fitted to the measured impairment covariance to obtain one or more scaling parameter values. A per-code energy value for a first data stream is then calculated from the one or more scaling parameter values. In some embodiments, the data-to-pilot power ratio for the received signal is first calculated from the one or more scaling parameters, and the per-code energy value calculated from the data-to-pilot power ratio.

12 Claims, 5 Drawing Sheets

OTHER PUBLICATIONS

3rd Generation Partnership Project. 3GPP TS 25.214, V8.3.0 (Sep. 2008). 3rd Generation Partnership Project; Technical Specification Group Radio Access Network; Physical layer procedures (FDD) (Release 8). Sep. 2008.

3rd Generation Partnership Project. 3GPP TS 25.101, V8.4.0 (Sep. 2008). 3rd Generation Partnership Project; Technical Specification Group Radio Access Network; User Equipment (UE) radio transmission and reception (FDD) (Release 8). Sep. 2008.

Grant et al., "Generalized RAKE Receivers for MIMO Systems," IEEE Vehicular Technology Conference, Orlando, FL, US, Oct. 6-9, 2003, pp. 424-428, vol. 1, IEEE, Piscataway, NJ, US.

* cited by examiner

CODE POWER ESTIMATION FOR MIMO SIGNALS

FIELD OF THE INVENTION

The present invention relates generally to wireless communication systems, and in particular to methods for estimating the data-to-pilot power ratio in a received multiple-input multiple-output precoded signal.

BACKGROUND

Spread-spectrum communication systems are well known in the art and widely deployed. A class of receivers well suited for use in spread-spectrum systems—such as those standardized in IS-95, IS-2000 (cdma2000), and the $3^{rd}$-Generation Partnership Project's (3GPP) Wideband Code-Division Multiple Access (W-CDMA) specifications—is the linear interference-whitening (LIW) receiver. LIW receivers suppress interference in addition to collecting signal energy for detection. One form of the LIW receiver is a transversal chip equalizer; another is a G-Rake receiver. The Rake receiver derives its name from its rake-like structure, wherein multiple receiver "fingers" are used to receive multiple signal images in a received multipath signal. By coherently combining the finger outputs in a weighted Rake combiner, the conventional Rake receiver can use multipath reception to improve the Signal to Interference-plus-Noise Ratio (SINR) of the received signal. A Generalized Rake (G-Rake) receiver improves interference suppression performance over a conventional Rake receiver, using more sophisticated generation of the combining weights.

Recently, 2×2 Multiple-input Multiple-Output (MIMO) technology has been standardized in Release 7 of the 3GPP specifications. The standardized scheme, referred to as Dual-Transmit Adaptive Arrays (D-TxAA), is similar to selective per-antenna rate control (S-PARC), except that adaptive unitary preceding is applied to each of the data streams, in this case to each of one or two High-Speed Downlink Shared Channel (HS-DSCH) data streams.

D-TxAA can be viewed as an extension of the previously standardized closed-loop-mode-1 (CL-1) transmit diversity scheme, in that the preceding vectors (which map a data stream to the multiple transmit antennas) used for each of the D-TxAA data streams are selected from the same codebook used for CL-1. In contrast to CL-1, however, D-TxAA includes two modes of operation—single-stream mode and dual-stream mode. In single-stream mode, one of the four possible precoding vectors from the CL-1 codebook is applied to a single data stream. In dual-stream mode, orthogonal pairs of precoding vectors (again selected from the CL-1 codebook) are applied to the two data streams. The use of preceding has a significant impact on the receiver, and in particular complicates the design of LIW receivers such as Rake receivers.

In a co-pending patent application titled "Receiver Parametric Covariance Estimation for Precoded MIMO Transmissions," U.S. patent application Ser. No. 12/036,323 (the "Grant" application), the entire contents of which are incorporated by reference herein, a MIMO G-Rake receiver operating at the symbol level is disclosed that is based upon the most general G-Rake formulation for MIMO. For a 2×2 MIMO scenario, this receiver computes impairment covariance matrices corresponding to the first and second streams of a dual-stream precoded signal as:

$$R_{stream1} = R + \alpha_{PC}(2) h_{\text{eff}}(b_2) h_{\text{eff}}^H(b_2) \quad (1)$$

and $$R_{stream2} = R + \alpha_{PC}(1) h_{\text{eff}}(b_1) h_{\text{eff}}^H(b_1) \quad (2)$$

Here, R is that portion of the impairment covariance not including the code-reuse interference. In other words, R captures impairment covariance arising from inter-symbol interference (ISI), multiple access interference (MAI), and noise. The second term in each expression is the code-reuse interference term.

In equations (1) and (2), the code-reuse interference term is a function of the effective net response corresponding to the interfering stream. For stream 1, for example, the interfering stream is stream 2, and the code-reuse term is a function of $h_{\text{eff}}(b_2)$; for stream 2, the interfering stream is stream 1, and the code-reuse term is a function of $h_{\text{eff}}(b_1)$. The vectors $b_1$ and $b_2$ are the preceding vectors applied to streams 1 and 2, respectively.

More particularly, if n indexes data streams, then the effective net response vector corresponding to the $n^{th}$ stream is given by:

$$h_{\text{eff}}(b_n) = b_{1n} h_1 + b_{2n} \sqrt{\frac{\gamma_p(1)}{\gamma_p(2)}} h_2, \quad (3)$$

where $b_n = [b_{1n} \ b_{2n}]^T$ is the preceding vector applied to the $n^{th}$ data stream. The vector $h_m$ is the net channel response associated with the $m^{th}$ transmit antenna (m=1 or 2). Each element of the net response vector $h_m$ corresponds to a given Rake finger. For example, for finger f (associated with delay $d_f$ and receive antenna l), the corresponding net channel response vector element is given by:

$$h_m(f) = \sum_{p=0}^{P-1} g_m(p, l) R_{TX/RX}(d_f - \tau_p), \quad (4)$$

where P is the number of paths, $g_m(p,l)$ is the channel estimate (medium response) associated with transmit antenna m, receive antenna l and path delay $\tau_p$, and $R_{TX/RX}(\tau)$ represents the convolution of the transmit and receive pulse shaping filters.

In equations (1) and (2), the code-reuse terms include a scaling factor, $\alpha_{PC}(n)$, representing the per-code energy allocated to interfering stream n. Assuming uniform power distribution across channelization codes, the per-code energy for the $n^{th}$ stream is given by:

$$\alpha_{PC}(n) = \left(\frac{1}{\gamma_p(1) N_p}\right)\left(\frac{N_s}{K}\right) \gamma_d(n) \Gamma_{D/P}. \quad (5)$$

Here, K is the number of channelization codes used for each data stream (and is the same for each stream) and $\Gamma_{D/P}$ is the ratio of the power allocated to the data channel (in the W-CDMA specifications, the High-Speed Downlink Shared Channel, or HS-DSCH) to the total power allocated to the pilot channels (in W-CDMA, the Common Pilot Channel, or CPICH). The quantity $\gamma_d(n)$ denotes the fraction of the total data power allocated to the $n^{th}$ data stream, and $\gamma_p(1)$ denotes the fraction of the total pilot power allocated to the first transmit antenna. The quantities $N_s$ and $N_p$ represent the spreading factors used for the data channel (typically sixteen) and the pilot channel (typically 256), respectively.

Given the preceding construction, the per-code energies $\alpha_{PC}(1)$ and $\alpha_{PC}(2)$ are needed by a receiver to compute the stream-specific covariance matrices $R_{stream1}$ and $R_{stream2}$.

Typically, all of the quantities in equation (5) are known to the receiver, with the possible exception of the data-to-pilot power ratio $\Gamma_{D/P}$. In the UMTS specifications, a provision exists for explicit signaling of the data-to-pilot power ratio. In this case, a mobile station may simply obtain a value for $\Gamma_{D/P}$ via a downlink control channel, and compute the per-code energies $\alpha_{PC}(n)$ directly, using equation (5). Another possible approach, where a value for $\Gamma_{D/P}$ cannot be obtained by signaling, is to simply use a pre-determined, nominal value for $\Gamma_{D/P}$. However, both of these approaches suffer in accuracy. In the first case, a value for $\Gamma_{D/P}$ obtained by explicit signaling can rapidly become out of date, since specifications currently call for signaling $\Gamma_{D/P}$ on an infrequent basis. In the second case, the computed values for $\Gamma_{D/P}$ may be very inaccurate when the actual data-to-pilot ratio strays significantly from the nominal, "assumed" value. Hence, methods for estimating per-code energies $\alpha_{PC}(n)$, or alternatively, for estimating a value for $\Gamma_{D/P}$ in order to facilitate calculation of the per-code energies, are needed.

SUMMARY

Disclosed herein are methods and apparatus for estimating per-code energy for one or more streams of a received multi-stream multiple-input multiple-output (MIMO) signal. The estimated per-code energy may be used to estimate code-reuse interference associated with each stream.

An estimate for the data-to-pilot power ratio, $\Gamma_{D/P}$, may be obtained as a by-product of parametric estimation of impairment covariance associated with the received MIMO signal. Fitting parameters obtained by fitting a parametric model of the impairment covariance to measured samples of the signal impairments may be used to calculate an estimate for $\Gamma_{D/P}$, which may in turn be used to calculate a per-code estimate for each stream of the multi-stream MIMO signal. The code-reuse interference associated with each stream is a function of the per-code energy and an effective net channel response corresponding to that stream.

Accordingly, in an exemplary method, a parametric impairment model is constructed for a received MIMO signal, the parametric model omitting code-reuse interference. Impairment covariance is measured, using, in one or more embodiments, received pilot symbol data. The parametric impairment model is fitted to the measured impairment covariance to obtain one or more scaling parameter values. A per-code energy value for a first data stream is then calculated from the one or more scaling parameter values. In some embodiments, the data-to-pilot power ratio for the received signal is first calculated from the one or more scaling parameters, and the per-code energy value calculated from the data-to-pilot power ratio.

Another embodiment relates to a wireless communication receiver for use in a mobile terminal in a wireless communication system employing multi-stream MIMO signals. The receiver includes a radio front-end circuit configured to provide a received signal of interest and processing circuitry configured to carry out one or more of the methods described herein for estimating code-reuse interference.

DETAILED DESCRIPTION

Figure 1:
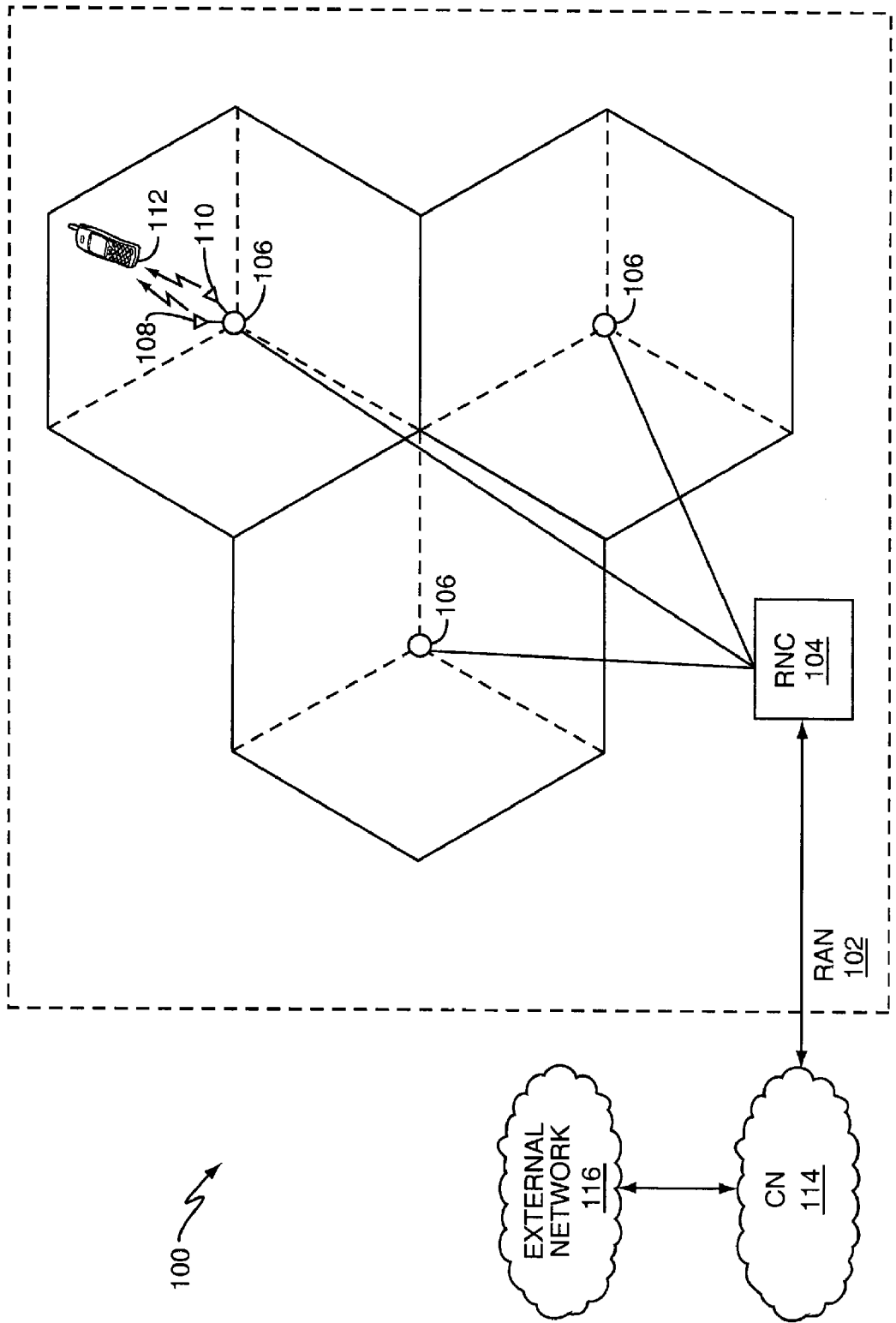
FIG. 1 is a functional block diagram of a wireless communication system.

FIG. 1 depicts an exemplary wireless communication system 100 employing multiple-input multiple-output (MIMO) transmissions, such as according to the D-TxAA specifications. Within a Radio Access Network (RAN) 102, a Radio Network Controller (RNC) 104 controls a plurality of base transceiver stations (BTS) 106, also known in the art as Node B's. Each Node B 106 provides radio communication services with subscriber mobile terminals 112 within a geographic area called a cell, which may be divided into sectors, as depicted in FIG. 1. The RNC 104 communicates with a Core Network (CN) 114, which in turn is connected to one or more external networks 116, such as the Public Switched Telephone Network (PSTN), the Internet, or the like.

Embodiments of the present invention are described herein with respect to WCDMA standards, including the specifications for D-TxAA, which is more fully described below. However, the invention is not so limited, and the inventive concepts disclosed and claimed herein may be advantageously applied to a wide array of transmit diversity systems.

Figure 2:
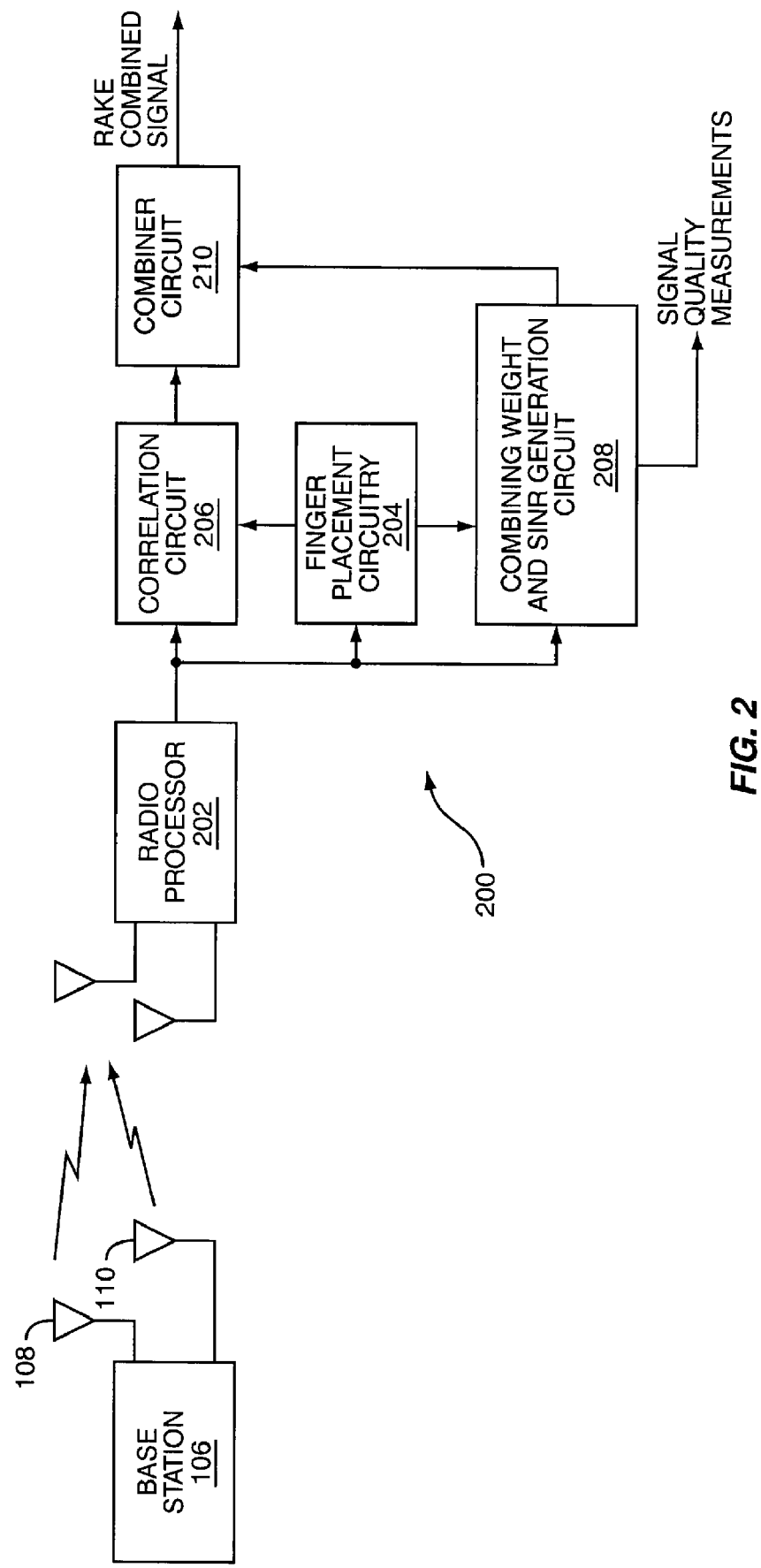
FIG. 2 is a functional block diagram of an exemplary symbol-level LIW receiver configured to process received signals transmitted from at least first and second transmit antennas.

Each base station 106 includes at least a primary transmit antenna 108 and a secondary transmit antenna 110 (either per-cell or per-sector, depending on the network 100 configuration), as shown in FIG. 2. The base station 106 may transmit an information signal, such as a precoded voice signal or a precoded High-Speed Downlink Packet Access (HSDPA) data signal, using both antennas 108 and 110. The signal transmitted on the secondary antenna 110 is weighted relative to the signal transmitted on the primary antenna 108, wherein the transmit weights may comprise phase offset only, or may more generally comprise a complex quantity having both phase and amplitude. The phase shift employed may be determined by feedback from the mobile terminal 112, thus forming a closed-loop transmit diversity system.

There are two main types of LIW receiver architectures. One uses symbol-level equalization, which is typically based on maximum likelihood estimation techniques. This type of receiver includes the G-Rake receiver 200, illustrated in block diagram form in FIG. 2. Radio processor 202 generates chip samples from a received signal, which includes the information signal transmitted from antennas 108 and 110 at base station 106. The chip samples are provided to a finger placement circuit 204, which determines the "finger delays," usually including multipath delays, used to despread a received CDMA signal in a correlation unit 206. The finger delays are also provided to a weight computer 208 that computes combining weights which are used to combine the despread values in a combiner 210 to produce soft values, or estimates of the symbol values.

Figure 3:
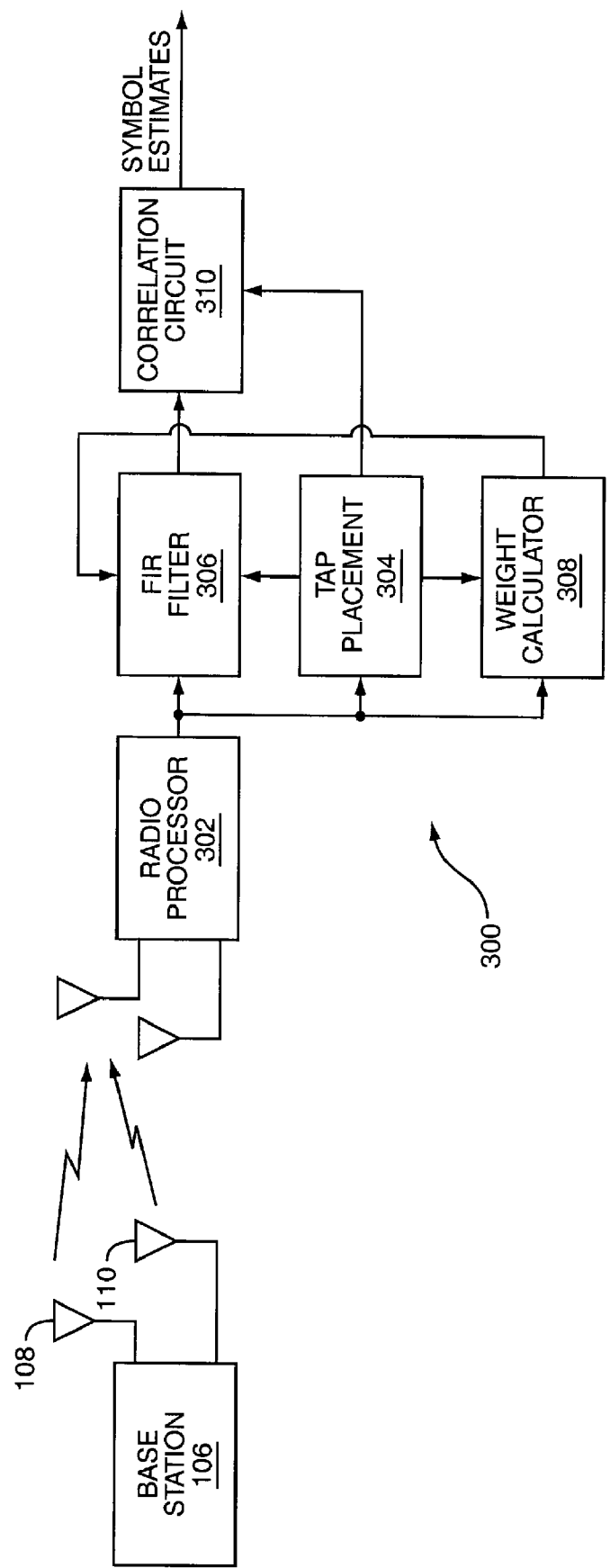
FIG. 3 is a functional block diagram of an exemplary chip-level LIW receiver configured to process received signals transmitted from at least first and second transmit antennas.

Another type of LIW receiver is a chip-level equalizer, which typically includes Minimum Mean-Square Error (MMSE) transversal chip equalization 300, as illustrated in block diagram form in FIG. 3. A radio processor 302 generates chip samples from a received signal. The chip samples are provided to a tap placement circuit 304, which determines the tap delays, related to multipath delays, for a Finite Impulse Response (FIR) filter 306. The selected tap delays are also provided to a weight calculator 308 that computes filter coefficients (or weights) for the FIR filter 306. The FIR filter 306 filters the chip samples to produce a signal that is de-spread by a correlator 310 to produce symbol estimates.

Figure 4:
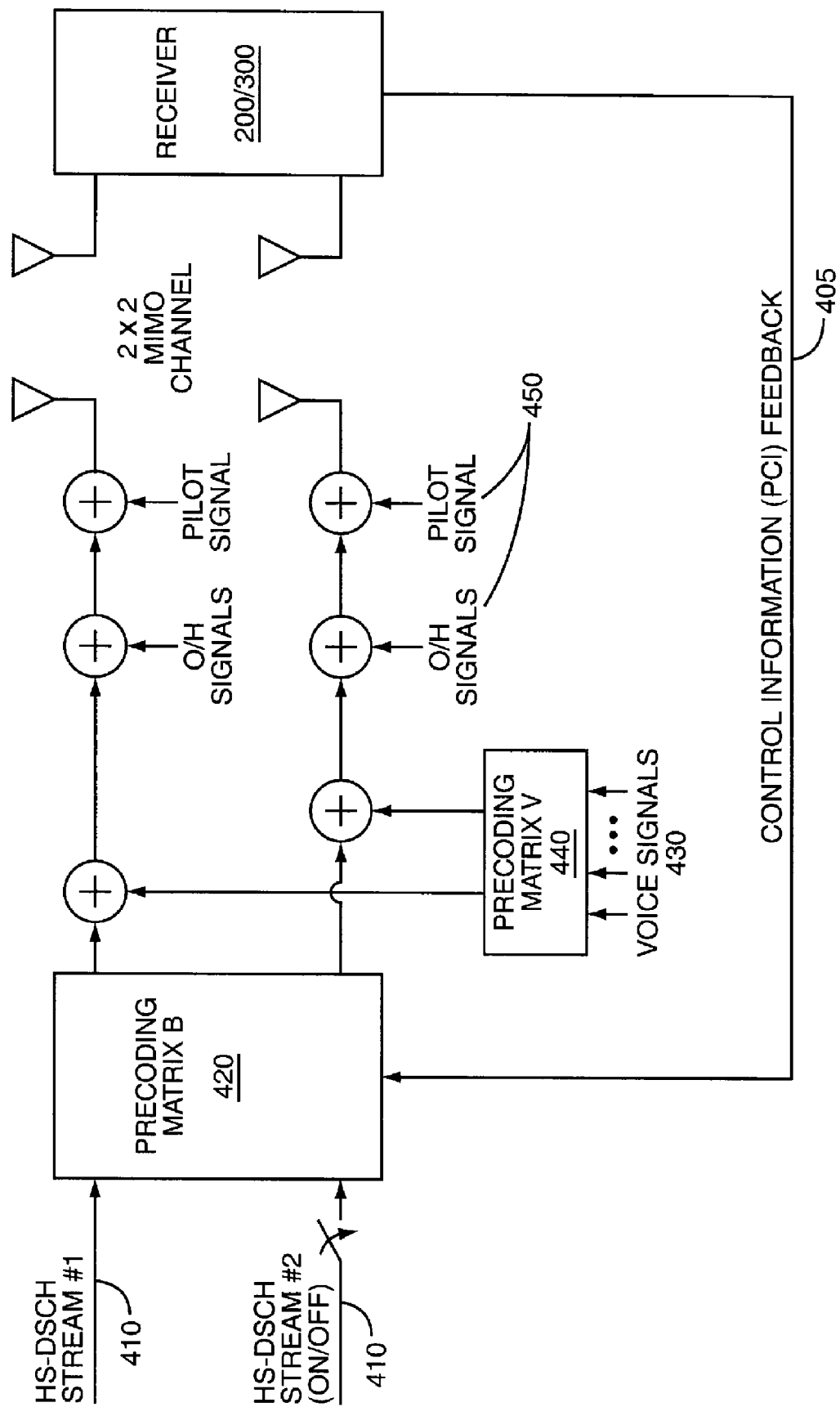
FIG. 4 is a block diagram illustrating the composition of a transmitted signal.

In order to provide context for a detailed discussion of impairment models, additional background of the D-TxAA MIMO scheme standardized by 3GPP in Release-7 High-Speed Packet Access (HSPA) specifications is provided here. A high-level view of the scheme is shown in FIG. 4. In Release-6 (non-MIMO) HSPA, the theoretical maximum downlink data rate is 14.4 Mbps, which is achieved using 15 codes, 16-QAM, and coding rate 1. With D-TxAA, this peak rate may be doubled to 28.8 Mbps by transmitting a second, separately encoded data stream in parallel when channel conditions warrant. Typically, this occurs at high signal-to-noise ratios (SNRs) and when the channel is full rank. In rank-deficient scenarios and/or at lower SNRs, the second data stream may be switched off, as indicated in the figure, so that only a single data HSPA data stream is transmitted.

D-TxAA uses a form of unitary preceding applied to the HS-DSCH data streams using the precoding weight matrix B. The weight vectors (columns of B) applied to each stream are drawn from the same codebook of four phase-only weights used for the closed-loop mode-1 (CL-1) transmit diversity option defined in Release 99 of the 3GPP specifications:

$$u_i = \frac{1}{\sqrt{2}} \begin{bmatrix} 1 \\ e^{j\frac{\pi}{4}(2i-1)} \end{bmatrix}, \quad i = 1,2,3,4. \tag{6}$$

Those skilled in the art will appreciate that while phase-only weights are used in D-TxAA as currently standardized, MIMO transmission more generally may use amplitude weighting as well. Further, the codebook from which the weight vectors are drawn is by no means limited to four entries.

In any event, for the case of single-stream D-TxAA transmission, the weight vector is a single one of the four possible vectors in the CL-1 codebook. For the case of dual-stream transmission, the two used weight vectors are selected to be orthogonal; hence, B is unitary. With respect to the CL-1 codebook as defined in Equation (1), the orthogonal pairings are thus (1,3) and (2,4) and permutations thereof.

With this structure, there are fundamentally eight different transmitter modes corresponding to the different choices for B and the different modes—4 single-stream modes and 4 dual-stream modes. The single-stream modes are defined by $$B \in \{[u_1\ 0], [u_2\ 0], [u_3\ 0], [u_4\ 0]\} \tag{7}$$

and the dual-stream modes by $$B \in \{[u_1\ u_3],\ [u_2\ u_4],\ [u_3\ u_1],\ [u_4\ u_2]\} \tag{8}$$

A selection of the "best" transmitter mode is made by the user equipment (UE) through maximizing some metric such as data rate, SINR, received power per-stream, or the like. The UE indicates its preferred precoding configuration through feedback, called preceding control information (PCI), transmitted to the Node B on the high-speed dedicated physical control channel (HS-DPCCH), as shown in FIG. 4. The PCI feedback 405 informs the scheduler in the Node B of the preferred number of data streams and the preferred precoding weight vector(s). The Node B signals the actually used preceding matrix B, as well as the actually transmitted number of streams, on the downlink high-speed shared control channel (HS-SCCH). This information is used to configure the receiver in the UE.

As can be seen in FIG. 4, a number of different signals form the composite transmitted signal on each antenna. These include the following: the one or two high-speed downlink shared channel (HS-DSCH) data streams 410 which are precoded, using matrix B, at block 420; a number of dedicated channel signals (e.g., voice and/or control), including voice signals 430, which may be configured using CL-1 transmit diversity using the matrix V at block 440; and a number of other overhead signals 450 (e.g., pilots, voice, control, etc.) that are not precoded. The preceding matrix V is given by $$V=[v_1\ v_2 \ldots v_K]. \tag{9}$$

where $K_v$ is the number of dedicated channels configured in CL-1 transmit diversity. Each precoding vector (column of V) is given by one of the 4 possible vectors in the CL-1 codebook.

It is important to note that when the transmitter is configured in dual-stream mode, the same set of channelization (spreading) codes is used for both streams. This creates self-interference that must be resolved by the receiver. In other words, when the receiver demodulates each stream, it must suppress cross-stream interference from the other stream.

As discussed above, per-code energy quantities $\alpha_{PC}(1)$ and $\alpha_{PC}(2)$ are needed to accurately characterize (or estimate) stream-specific signal impairments for a dual-stream MIMO signal. Furthermore, these per-code energy quantities may be directly computed, using equation (5), if a value for the data-to-pilot power ratio is known. Thus, in one approach to estimating values for $\alpha_{PC}(1)$ and $\alpha_{PC}(2)$, an estimate of $\Gamma_{D/P}$ is first obtained. This estimate is obtained as a by-product of the parametric construction of R, which appears in both equations (1) and (2).

As explained above, R is that portion of the impairment covariance matrices for each of stream 1 and 2 that does not include the effects of code-reuse. As shown in the Grant application discussed above, a parametric estimate of R may be formed using fitting parameters (derived from a least-squares fitting process) that scale two or more interference model terms. It can be shown that the fitting parameters themselves are a function of $\Gamma_{D/P}$. As a result, a system of equations may be formed, based on a subset of the estimated fitting parameters. A value for $\Gamma_{D/P}$ can be computed directly from this system of equations. The ability to form such a system of equations is a direct consequence of the presence of multiple transmit antennas, to which the multiple fitting parameters correspond.

As shown in the Grant application, R may be constructed as follows:

$$R=\alpha_1 R_{11}+\alpha_2 R_{22}+\alpha_{12}^+ R_{12}^+ + j\alpha_{12}^- R_{12}^- +\beta R_N \tag{10}$$

Here, the impairment matrix term $R_{11}$ corresponds to a first transmit antenna, the term $R_{22}$ corresponds to a second transmit antenna, and the terms $R_{12}^+$ and $R_{12}^-$ correspond jointly to both antennas. The term $R_N$ corresponds to noise plus other-cell-interference. The scaling parameters $\alpha_1$, $\alpha_2$, $\alpha_{12}^+$, $\alpha_{12}^-$, and $\beta$ capture the energies of the various impairment sources.

Parametric construction of R includes three steps. In the first step, the impairment terms $R_{11}$, $R_{22}$, $R_{12}^+$, $R_{12}^-$, and $R_N$ are computed directly, based on propagation channel estimates, chip-pulse shape information, and receiver finger delay information. In the second step, samples of the impairment process are generated from de-spread values of the pilot channels, from which a "measured" value of R is determined.

(Procedures for measuring signal impairment covariance are well known. One such process is described in U.S. Patent Application Publication 2005/0201447, the contents of which are incorporated herein by reference.) The measured value is denoted $\tilde{R}_{measured}$. In the third step, a system of equations is formed in the five unknown scaling parameters $\alpha_1$, $\alpha_2$, $\alpha_{13}^+$, $\alpha_{12}^-$, and $\beta$ by equating the right-hand-side of equation (10) to $\tilde{R}_{measured}$. Solving this system of equations using a least-squares approach yields estimates of the five scaling parameters.

An estimate of the data-to-pilot power ratio $\Gamma_{D/P}$ may be obtained as a by-product of the above parameter estimation process. As shown in the Grant application, several of the scaling parameters are functions of the data-to-pilot power ratio $\Gamma_{D/P}$. For the special case when no own-cell signals other than the data signals are precoded (e.g., configured in CL-1 transmit diversity), the true underlying values of the first two fitting parameters are given by $$\alpha_{1,true} = \frac{1}{\gamma_p(1)N_p}\left[\frac{1}{2}\Gamma_{D/P} + \gamma_o(1)\Gamma_{O/P} + \gamma_p(1)\right] \quad (11)$$

$$\alpha_{2,true} = \frac{1}{\gamma_p(2)N_p}\left[\frac{1}{2}\Gamma_{D/P} + \gamma_o(2)\Gamma_{O/P} + \gamma_p(2)\right].$$

These expressions may also serve as good approximations, even when some own-cell signals (e.g., voice) are precoded.

Most of the terms in equation (11) have been defined in relation to equation (5). Among the remaining, $\Gamma_{D/P}$ denotes the ratio of the power allocated to all overhead signals (i.e., voice, control, etc.) to the total power allocated to the pilot channels. The quantity $\gamma_o(m)$ denotes the fraction of the overhead power allocated to the $m^{th}$ transmit antenna.

By equating the right-hand-side of equation (11) to the estimates for $\alpha_1$ and $\alpha_2$ obtained in the least-squares parameter estimation process described above, the following system of equations in the two unknowns $\Gamma_{D/P}$ and $\Gamma_{D/P}$ is obtained:

$$\begin{bmatrix} 1/2 & \gamma_o(1) \\ 1/2 & \gamma_o(2) \end{bmatrix}\begin{bmatrix} \Gamma_{D/P} \\ \Gamma_{O/P} \end{bmatrix} = \begin{bmatrix} \gamma_p(1)(N_p\alpha_1 - 1) \\ \gamma_p(2)(N_p\alpha_2 - 1) \end{bmatrix}. \quad (12)$$

The remaining terms in this system (other than $\Gamma_{D/P}$ and $\Gamma_{D/P}$) are either known to the receiver or can be estimated. The spreading factor of the pilot, $N_p$, is always known to the receiver. (Typically, $N_p=256$). The pilot power distribution across antennas, represented above by $\gamma_p(1)$ and $\gamma_p(2)$, is typically fixed, and may be known to the mobile terminal by explicit higher layer signaling. Alternatively, the pilot power distribution values $\gamma_p(1)$ and $\gamma_p(2)$ may be estimated, and smoothed over a long time period, since the distribution is fixed for a given cell site. Note that in many cases $\gamma_p(1)=\gamma_p(2)=\frac{1}{2}$; i.e., the pilot power is uniformly distributed between the transmit antennas. Similarly, the overhead power distribution factors $\gamma_0(1)$ and $\gamma_0(2)$ might, in some cases, not be made known to the mobile terminal through any explicit signaling mechanism. However, overhead power is often allocated only to the first transmit antenna, i.e., $\gamma_0(1)=1$ and $\gamma_0(2)=0$. Absent any prior knowledge, this distribution may be used as a default setting in the estimation of $\Gamma_{D/P}$.

Assuming $\gamma_p(1)=\gamma_p(2)=\frac{1}{2}$ and $\gamma_0(1)=1$ and $\gamma_0(2)=0$, the system of equations in equation (12) may be solved for $\Gamma_{D/P}$, yielding the following estimate:

$$\Gamma_{D/P}=N_p\alpha_2-1 \quad (13)$$

Thus, after performing the least-squares fitting process in constructing R, only the parameter estimate $\alpha_2$ is required to compute $\Gamma_{D/P}$, using a very simple formula. (Those skilled in the art will appreciate that computing $\Gamma_{D/P}$ using equation (12) is only slightly more complex when other pilot power distributions or overhead power distributions are used.) With this estimate in hand, the desired per-code energies $\alpha_{PC}(1)$ and $\alpha_{PC}(2)$ may be computed easily, using equation (5).

Those skilled in the art will recognize that an estimate of the overhead-to-pilot power ratio, $\Gamma_{O/P}$, may also be obtained by solving the system of equations in equation (12). This quantity is generally not needed in order to compute the per-code energies $\alpha_{PC}(1)$ and $\alpha_{PC}(2)$. In any case, given the special case of $\gamma_p(1)=\gamma_p(2)=\frac{1}{2}$ and $\gamma_o(1)=1$ and $\gamma_o(2)=0$, an estimate of $\Gamma_{O/P}$ is given by:

$$\Gamma_{O/P} = \frac{1}{2}N_p(\alpha_1 - \alpha_2). \quad (14)$$

Figure 5:
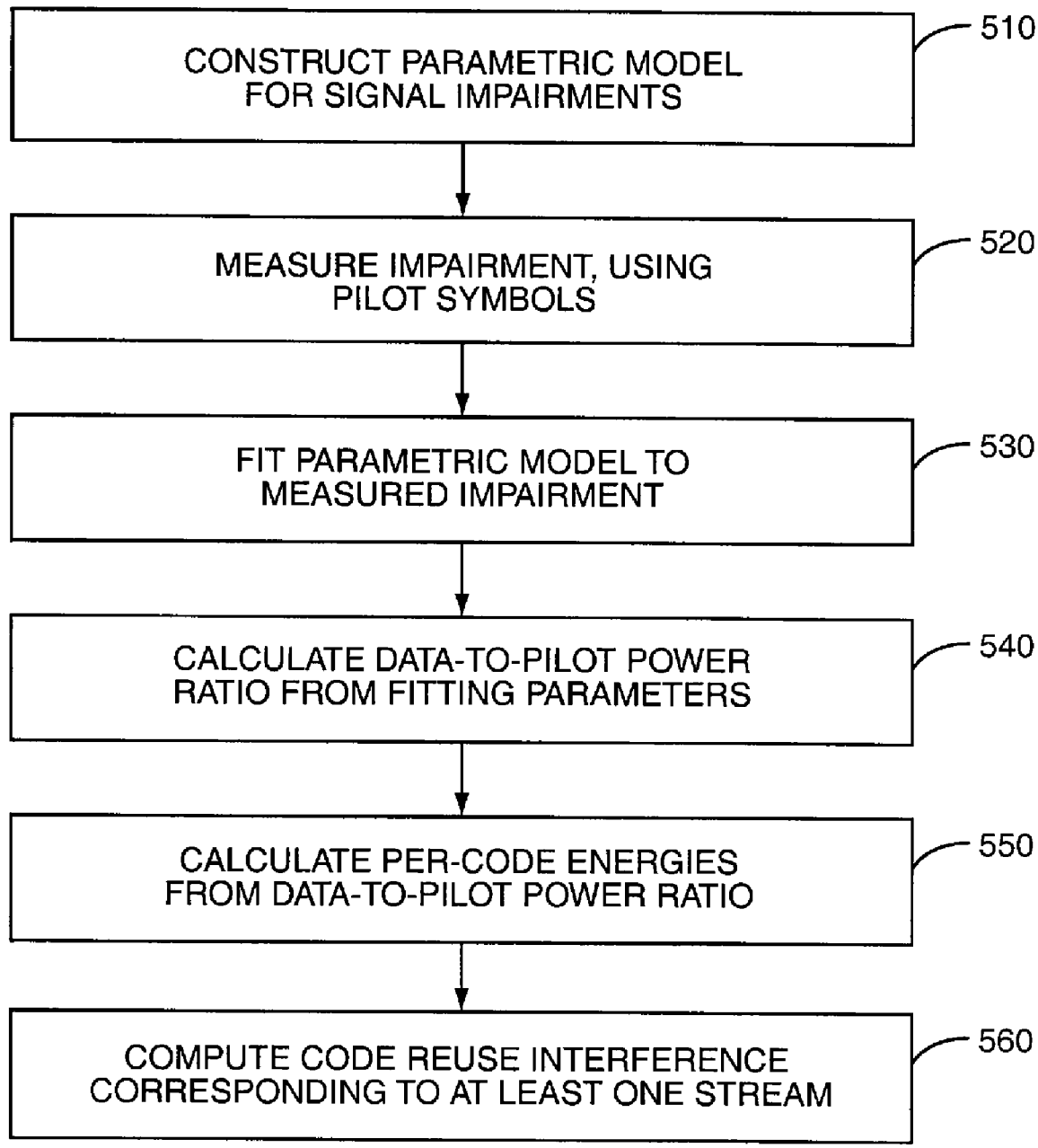
FIG. 5 is a flow diagram of an exemplary method of estimating code-reuse interference associated with a received multi-stream MIMO signal.

FIG. 5 thus illustrates a method for estimating code-reuse interference associated with a received multi-stream MIMO signal, based on the above analysis. Those skilled in the art will appreciate that the techniques disclosed above, while described in terms of a dual-stream, precoded MIMO signal, may be readily extended to cover other multi-stream MIMO signals.

Accordingly, a parametric model for signal impairments associated with the multi-stream MIMO signal is constructed, as shown at block 510. One approach for constructing such a model is described above. However, other model structures may also be used.

For instance, co-pending patent application titled "Reduced-Complexity Parametric Covariance Estimation for Precoded MIMO Transmissions," U.S. patent application Ser. No. 12/036,337 (the "Grant/Cairns" application), the entire contents of which are incorporated by reference herein, discloses a parametric model for estimating signal impairments associated with a MIMO that employs fewer terms than the model of equation (10).

According to the Grant/Cairns application:

$$R = (\Gamma_{O/P} + \Gamma_{D/P})\left(\frac{1}{2N_p\gamma_p(1)}R_{11} + \frac{1}{2N_p\gamma_p(2)}R_{22}\right) + \quad (15)$$
$$\frac{1}{N_p}(R_{11} + R_{22}) + \beta R_n.$$

(As explained in the Grant/Cairns application, the formulation of equation (15) is exact under certain circumstances and a reasonable approximation in others.) The Grant/Cairns application goes on to show that the above expression may be re-formulated as:

$$R = \mu(k_1R_{11}+k_2R_{22})+k_3(R_{11}+R_{22})+\beta R_n, \quad (16)$$

the right side of which expression may be more conveniently fitted to measured impairment covariance for the MIMO signal to obtain estimated values for the fitting parameters μ and β.

Given this model, only the fitting parameter u depends on the data-to-pilot power ratio $\Gamma_{D/P}$, and in fact depends on the sum of $\Gamma_{D/P}$ and the overhead-to-pilot power ratio $\Gamma_{O/P}$. If a value for $\Gamma_{O/P}$ is not known, $\Gamma_{O/P}$ may be estimated, or a nominal value, such as zero, may simply be assigned to $\Gamma_{O/P}$.

If $\Gamma_{O/P}$ is "assumed" to be zero, then, for the model given above, the estimated value for $\Gamma_{D/P}$ is simply equal to the fitting parameter $\mu$.

At block 520, impairment covariance or data covariance is measured, to provide an up-to-date sample of the signal impairments. Those skilled in the art will appreciate that whether impairment covariance or data covariance is measured will depend on the receiver implementation. Typically, a G-Rake receiver is configured to perform impairment covariance measurements using pilot channel data. The measured impairment covariance can be obtained through the following approach, assuming the so-called "diversity pilot scheme" defined in the standard is utilized.

First, the measured net response corresponding to each transmit antenna is computed, according to:

$$\hat{h}_A = \frac{1}{N}\sum_{n=0}^{N-1} x_p(n)s_A^*(n). \qquad (17)$$

Here, $x_p(n)$ is a vector of de-spread pilot symbols for the nth super-symbol in a slot (vector elements correspond to finger outputs), where de-spreading is performed over 512 chips (two pilot symbol periods); $s_A(n)$ is the nth pilot super-symbol corresponding to transmit antenna A (A=1 or A=2); and N=5 is the number of pilot super-symbols per slot. For the first antenna, the pilot super-symbols are given simply by $$s_1(n) = \frac{1}{\sqrt{2}}(1+j)$$

for all n. For the second antenna, the pilot super-symbols are given by $$s_2(n) = \frac{1}{\sqrt{2}}(1+j)(-1)^{n+i}$$

where i=0 . . . 14 indexes the 15 slots within each WCDMA radio frame.

Next the measured impairment covariance corresponding to each transmit antenna is computed, according to:

$$\hat{R}_A = \frac{1}{N-1}\sum_{n=0}^{N-1}(x_p(n)s_A^*(n) - \hat{h}_A)(x_p(n)s_A^*(n) - \hat{h}_A)^H. \qquad (18)$$

Finally, the overall measured impairment covariance matrix (excluding code-reuse) is computed as:

$$\hat{R}=\hat{R}_1+\hat{R}_2 \qquad (19)$$

Referring once again to FIG. 5, at block 530 the parametric model constructed at block 510 is "fitted" to the measured impairment covariance obtained at block 520. A least-squares or other fitting approach may be used, treating equations with complex quantities as two real-value equations, as is well known in the art. Once instantaneous values for the scaling parameters have been determined, they may additionally be smoothed, or filtered, over successive estimates of the scaling parameter values, to reduce estimation noise.

At block 540, the data-to-pilot power ratio $\Gamma_{D/P}$ is calculated from the fitting parameters obtained at block 530. Given the complete impairment model of equation (10), the data-to-pilot power ratio may be obtained by solving the system of equation (12), where $\alpha_1$ and $\alpha_2$ are fitting parameter values obtained at block 530. For other impairment models, those skilled in the art may readily derive the relationship between the fitting parameters and $\Gamma_{D/P}$ and solve the resulting equation or system of equations to obtain an estimate of $\Gamma_{D/P}$.

At block 550, stream-specific per-code energies $\alpha_{PC}(1)$ and $\alpha_{PC}(2)$ are calculated, based on the data-to-pilot power ratio $\Gamma_{D/P}$, using equation (5). The stream-specific per-code energies may then be used at block 560 to compute an estimate for code-reuse interference associated with each stream:

$$R_{reuse1}=\alpha_{PC}(1)h_{eff}(b_1)h_{eff}^H(b_1)$$

$$R_{reuse2}=\alpha_{PC}(2)h_{eff}(b_2)h_{eff}^H(b_2) \qquad (19)$$

where $R_{reuse1}$ represents the interference from the first stream (to the second stream) and $R_{reuse2}$ represents the interference from the second stream. The stream-specific code-reuse interference may then be used to estimate overall stream-specific impairment according to equations (1) and (2):

$$R_{stream1}=R+R_{reuse2}$$

$$R_{stream2}=R+R_{reuse1} \qquad (20)$$

Thus, the code-reuse interference from stream 2 forms part of the overall stream-specific specific signal impairments for stream 1, and vice versa. Those skilled in the art will appreciate that this approach may be readily extended to signals including more than two streams.

Those skilled in the art will further appreciate that the stream-specific impairment estimates calculated according to the above techniques may be used for several purposes, such as for computing interference-suppressing combining weights for detecting and demodulating the transmitting data streams. The estimated impairment covariance may also be used, for example, to estimate channel quality, i.e., to estimate or predict signal-to-noise-plus-interference or other channel quality metric.

Embodiments of the present invention thus provide methods for estimating code-reuse interference associated with a received multi-stream multiple-input multiple-output (MIMO) signal. The disclosed techniques are applicable to both symbol-level (G-Rake) and chip-level (chip equalizer) LIW receivers, the two main architectures for advanced W-CDMA receivers. Those skilled in the art will appreciate that the particular design of a LIW receiver in accordance with the inventive techniques, and the associated nomenclature used in connection with such a receiver, may vary according to the network standard involved, but such variations are not germane to understanding or explaining the present invention. Moreover, it should be understood that the networks and radio devices illustrated and discussed herein are simplified; actual implementations likely will have additional entities omitted herein for clarity.

Nevertheless, an exemplary mobile terminal 112 includes one or both of the exemplary receiver circuits 200 or 300, illustrated in FIGS. 2 and 3, respectively. These receiver circuits may be implemented using various processing circuits, including A/D converters, filters, DSPs or other digital processors, memory, and the like. In at least one exemplary embodiment, mobile terminal 112 includes one or more DSPs and/or Application Specific Integrated Circuits (ASICS) or other programmable devices to implement receiver 112, including a G-Rake receiver as illustrated in FIG. 2. The processing circuits may be configured to include processing logic to carry out one or more of the methods described herein. It should thus be understood that at least a portion of the present invention's functionality may be embodied as stored computer instructions in the form of micro-code, firmware, software, etc.

More generally, the present invention can be implemented in hardware, software, or essentially any combination thereof, according to the needs of a particular design. Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of estimating per-code energy for one or more streams of a received multi-stream multiple-input multiple-output (MIMO) signal, the method comprising:
    Using a processor constructing a parametric model for impairments of the received multi-stream MIMO signal, the parametric model omitting code-reuse interference;
    measuring impairment covariance or data covariance associated with the received multi-stream MIMO signal;
    fitting the parametric model to the measured impairment covariance or data covariance to obtain one or more scaling parameter values; and
    calculating a per-code energy value for a first stream of the received multi-stream MIMO signal, as a function of the one or more scaling parameter values.

2. The method of claim 1, wherein the parametric model comprises a first and second model term scaled by a first and second scaling parameter, respectively, wherein the first model term is computed as a function of first propagation channel estimates corresponding to a first transmit antenna and the second model term is computed as a function of second propagation channel estimates corresponding to a second transmit antenna, and wherein the one or more scaling parameter values correspond to the first and second scaling parameters.

3. The method of claim 1, wherein measuring impairment covariance associated with the received multi-stream MIMO signal comprises calculating the measured impairment covariance from a plurality of de-spread pilot symbol values.

4. The method of claim 1, wherein calculating the per-code energy value comprises estimating a data-to-pilot power ratio for the received multi-stream MIMO signal, based on the one or more scaling factors, and calculating the per-code energy value as a function of the estimated data-to-pilot power ratio.

5. The method of claim 1, further comprising:
    computing code-reuse interference associated with said first stream as a function of the per-code energy value and a first effective net channel response corresponding to the first stream.

6. The method of claim 5, further comprising:
    calculating a per-code energy value for a second stream of the received multi-stream MIMO signal, as a function of the one or more scaling parameter values; and
    computing code-reuse interference associated with said second stream as a function of the per-code energy value and a second effective net channel response corresponding to the second stream.

7. A wireless communication receiver, comprising:
    a radio front-end circuit configured to receive a multi-stream multiple-input multiple-output (MIMO) signal; and
    one or more processing circuits configured to:
        construct a parametric model for impairments of the received multi-stream MIMO signal, the parametric model omitting code-reuse interference;
        measure impairment covariance or data covariance associated with the received multi-stream MIMO signal;
        fit the parametric model to the measured impairment covariance or data covariance to obtain one or more scaling parameter values; and
        calculate a per-code energy value for a first stream of the received multi-stream MIMO signal, as a function of the one or more scaling parameter values.

8. The wireless communication receiver of claim 7, wherein the one or more processing circuits are configured to construct a parametric model comprising a first and second model term scaled by a first and second scaling parameter, respectively, wherein the first model term is computed as a function of first propagation channel estimates corresponding to a first transmit antenna and the second model term is computed as a function of second propagation channel estimates corresponding to a second transmit antenna, and wherein the one or more scaling parameter values correspond to the first and second scaling parameters.

9. The wireless communication receiver of claim 7, wherein the one or more processing circuits are configured to measure impairment covariance associated with the received multi-stream MIMO signal by calculating the measured impairment covariance from a plurality of de-spread pilot symbol values.

10. The wireless communication receiver of claim 7, wherein the one or more processing circuits are configured to calculate the per-code energy value by estimating a data-to-pilot power ratio for the received multi-stream MIMO signal, based on the one or more scaling factors, and calculating the per-code energy value as a function of the estimated data-to-pilot power ratio.

11. The wireless communication receiver of claim 7, wherein the one or more processing circuits are further configured to compute code-reuse interference associated with said first stream as a function of the per-code energy value and a first effective net channel response corresponding to the first stream.

12. The wireless communication receiver of claim 11, wherein the one or more processing circuits are further configured to:
    calculate a per-code energy value for a second stream of the received multi-stream MIMO signal, as a function of the one or more scaling parameter values; and
    compute code-reuse interference associated with said second stream as a function of the per-code energy value and a second effective net channel response corresponding to the second stream.

* * * * *